United States Patent
Foschi et al.

(10) Patent No.: US 12,312,990 B1
(45) Date of Patent: May 27, 2025

(54) CATALYTIC WALL-FLOW FILTER

(71) Applicant: Johnson Matthey Public Limited Company, London (GB)

(72) Inventors: Francesco Foschi, Royston (GB); James Googan, Royston (GB); Anton MacMinn, Royston (GB); David Marvell, Royston (GB); Stuart David Reid, Royston (GB); Keimoy St Hill, Royston (GB); Mark Walton, Royston (GB); Thilanka Wijemanne, Royston (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 18/506,161

(22) Filed: Nov. 10, 2023

Related U.S. Application Data

(60) Provisional application No. 63/385,250, filed on Nov. 29, 2022.

(51) Int. Cl.
| | |
|---|---|
| *F01N 3/28* | (2006.01) |
| *B01D 53/94* | (2006.01) |
| *B01J 29/04* | (2006.01) |
| *B01J 29/06* | (2006.01) |
| *B01J 29/76* | (2006.01) |
| *B01J 29/78* | (2006.01) |
| *B01J 29/89* | (2006.01) |
| *B01J 31/02* | (2006.01) |
| *F01N 3/035* | (2006.01) |
| *F01N 3/20* | (2006.01) |

(52) U.S. Cl.
CPC ......... *F01N 3/281* (2013.01); *B01D 53/9418* (2013.01); *F01N 3/2066* (2013.01); *B01D 2255/904* (2013.01); *B01D 2255/915* (2013.01); *B01D 2255/9155* (2013.01); *B01J 29/048* (2013.01); *B01J 29/06* (2013.01); *B01J 29/763* (2013.01); *B01J 29/783* (2013.01); *B01J 29/89* (2013.01); *B01J 31/0278* (2013.01); *B01J 31/0279* (2013.01); *F01N 3/035* (2013.01); *F01N 2510/0682* (2013.01); *F01N 2510/0684* (2013.01)

(58) Field of Classification Search
CPC combination set(s) only.
See application file for complete search history.

(56) References Cited

U.S. PATENT DOCUMENTS

| | | |
|---|---|---|
| 6,599,570 B1 | 7/2003 | Aderhold |
| 8,703,236 B2 | 4/2014 | Chandler |
| 9,138,735 B2 | 9/2015 | Roberts |
| 2008/0202107 A1* | 8/2008 | Boorse ..................... B01J 35/19 422/177 |
| 2011/0274601 A1 | 11/2011 | Boorse |
| 2012/0186229 A1* | 7/2012 | Phillips ................ B01J 37/0244 60/274 |
| 2015/0152768 A1 | 6/2015 | Arulraj et al. |
| 2018/0045097 A1* | 2/2018 | Tang ........................ B01J 29/76 |
| 2018/0111089 A1* | 4/2018 | Li ............................ B01J 23/42 |
| 2018/0133702 A1 | 5/2018 | Kim |
| 2018/0156090 A1* | 6/2018 | Xue ........................ B01J 23/44 |
| 2018/0266290 A1* | 9/2018 | Burgess ............ B01D 53/9468 |
| 2019/0247792 A1 | 8/2019 | Ren |
| 2019/0283011 A1 | 9/2019 | Chen |
| 2021/0379530 A1 | 12/2021 | Peter |

FOREIGN PATENT DOCUMENTS

EP 3122458 B1 1/2020

* cited by examiner

*Primary Examiner* — Binh Q Tran

(57) ABSTRACT

A catalytic wall-flow monolith filter for use in an emission treatment system is disclosed. The filter comprises porous walls, a first face and a second face defining a longitudinal direction therebetween and first and second pluralities of channels extending in the longitudinal direction. The first plurality of channels provides a first plurality of inner surfaces and is open at the first face and closed at the second face; and the second plurality of channels provides a second plurality of inner surfaces and is open at the second face and closed at the first face. The filter comprises a first selective catalytic reduction (SCR) catalyst coated on the first plurality of inner surfaces of the porous walls to form a first SCR catalyst porous layer, a second SCR catalyst within the porous walls, and a third SCR catalyst coated on the second plurality of inner surfaces of the porous walls to form a third SCR catalyst porous layer.

17 Claims, No Drawings

CATALYTIC WALL-FLOW FILTER

FIELD OF THE INVENTION

The present invention relates to a catalytic wall-flow monolith filter suitable for use in an emission treatment system, such as an automobile internal combustion exhaust system. The invention provides an effective method for remediating engine exhaust streams.

BACKGROUND OF THE INVENTION

There are concerns about emissions of particulate matter (PM), commonly referred to as soot, from internal combustion engines and especially from diesel and gasoline engines in automotive applications. The main concerns are associated with potential health effects, and in particular with very tiny particles having sizes in the nanometer range.

Diesel particulate filters (DPFs) and gasoline particulate filters (GPFs) have been fabricated using a variety of materials including sintered metal, ceramic or metal fibres etc., with the most common type in actual mass production being the wall-flow kind made from porous ceramic material fabricated in the form of a monolithic array of many small channels running along the length of the body. Alternate channels are plugged at one end so the exhaust gas is forced through the porous ceramic channel walls that prevent most of the particulate from passing through so only filtered gas enters the environment. Ceramic wall-flow filters in commercial production include those made from cordierite, various forms of silicon carbide and aluminium titanate. The actual shape and dimensions of practical filters on vehicles as well as properties such as the channel wall thickness and its porosity etc. depend on the application concerned. The average dimensions of the pores in the filter channel walls of a ceramic wall-flow filter through which the gas passes are typically in the range 5 to 50 µm and usually about 20 µm. In marked contrast, the size of most diesel particulate matter from a modern passenger car high speed diesel engine is much smaller, e.g., 10 to 200 nm.

Some PM may be retained within the pore structure in the filter walls and this may in some applications gradually build up until the pores are bridged over by a network of PM and this PM network then enables the easy formation of a cake of particulate on the internal walls of the filter channels. The particulate cake is an excellent filter medium and its presence affords very high filtration efficiency. In some applications soot is burned continuously on the filter as it is deposited which prevents a particulate cake from building up on the filter.

For some filters, for example light duty diesel particulate filters, it is periodically necessary to remove trapped PM from the filter to prevent the build-up of excessive back pressure that is detrimental to engine performance and can cause poor fuel economy. So in diesel applications, retained PM is removed from the filter by burning it in air in a process during which the amount of air available and the amount of excess fuel used to achieve the high temperature needed to ignite the retained PM are very carefully controlled. Towards the end of this process, that is usually called regeneration, the removal of the last remaining particulate in the filter can lead to a marked decrease in filtration efficiency and release of a burst of many small particles into the environment. Thus, filters may have low filtration efficiency when they are first used and subsequently after each regeneration event and also during the latter part of each regeneration process.

Thus, it would be desirable to improve and/or maintain filtration efficiency at all times—for example during the early life of a filter when it is first used, and or during regeneration and immediately afterwards, and or when the filter is loaded with soot.

SUMMARY OF THE INVENTION

According to a first aspect there is provided a catalytic wall-flow monolith filter for use in an emission treatment system, the catalytic wall-flow monolith filter comprising porous walls and having a first face and a second face defining a longitudinal direction therebetween and first and second pluralities of channels extending in the longitudinal direction,
- wherein the first plurality of channels provides a first plurality of inner surfaces and is open at the first face and closed at the second face, and wherein the second plurality of channels provides a second plurality of inner surfaces and is open at the second face and closed at the first face;
- wherein the monolith filter comprises a first selective catalytic reduction (SCR) catalyst coated on the first plurality of inner surfaces of the porous walls to form a first SCR catalyst porous layer;
- wherein the monolith filter comprises a second SCR catalyst within the porous walls;
- wherein the monolith filter comprises a third SCR catalyst coated on the second plurality of inner surfaces of the porous walls to form a third SCR catalyst porous layer;
- wherein the first SCR catalyst porous layer is coated from the first face;
- wherein the second SCR catalyst is coated from the second face; and
- wherein the third SCR catalyst porous layer is coated from the second face.

According to a second aspect there is provided a method for the manufacture of a catalytic wall-flow monolith filter, the method comprising:
- (a) providing a wall-flow monolith substrate comprising porous walls having a first end face and a second end face defining a longitudinal direction therebetween and first and second pluralities of channels extending in the longitudinal direction, wherein the first plurality of channels is open at the first end face and closed at the second end face, and wherein the second plurality of channels is open at the second end face and closed at the first end face;
- (b) applying a first SCR catalyst washcoat slurry on the first plurality of inner surfaces of the porous walls;
- (c) applying a second SCR catalyst washcoat slurry on the second plurality of inner surfaces of the porous walls so that the second SCR catalyst washcoat slurry permeates in the porous walls;
- (d) applying a third SCR catalyst washcoat slurry on the second plurality of inner surfaces of the porous walls;
- (e) calcining a coated wall-flow monolith substrate obtained from steps (b), (c), and (d) to produce the catalytic wall-flow monolith filter.

According to a third aspect there is provided an emission treatment system for treating a flow of a combustion exhaust gas, the system comprising the catalytic wall-flow monolith filter described in this disclosure, wherein the first end face is upstream of the second end face.

According to a fourth aspect there is provided a method for treating a flow of a combustion exhaust gas comprising NOx, the method comprising passing the exhaust stream through the catalytic wall-flow monolith filter described in this disclosure, wherein the first end face is upstream of the second end face.

DETAILED DESCRIPTION OF THE INVENTION

The present invention will now be further described. In the following passages different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

According to a first aspect there is provided a catalytic wall-flow monolith filter for use in an emission treatment system, the catalytic wall-flow monolith filter comprising porous walls and having a first face and a second face defining a longitudinal direction therebetween and first and second pluralities of channels extending in the longitudinal direction, wherein the first plurality of channels provides a first plurality of inner surfaces and is open at the first face and closed at the second face, and wherein the second plurality of channels provides a second plurality of inner surfaces and is open at the second face and closed at the first face;

wherein the monolith filter comprises a first SCR catalyst coated on the first plurality of inner surfaces of the porous walls to form a first SCR catalyst porous layer;

wherein the monolith filter comprises a second SCR catalyst within the porous walls;

wherein the monolith filter comprises a third SCR catalyst coated on the second plurality of inner surfaces of the porous walls to form a third SCR catalyst porous layer;

wherein the first SCR catalyst porous layer is coated from the first face;

wherein the second SCR catalyst is coated from the second face; and wherein the third SCR catalyst porous layer is coated from the second face.

The catalytic wall-flow monolith filter comprises porous walls and having a first face and a second face defining a longitudinal direction therebetween and first and second pluralities of channels extending in the longitudinal direction, wherein the first plurality of channels provides a first plurality of inner surfaces and is open at the first face and closed at the second face, and wherein the second plurality of channels provides a second plurality of inner surfaces and is open at the second face and closed at the first face. The channels are preferably parallel to each other to provide a constant wall thickness between the channels. As a result, gases entering one of the plurality of channels cannot leave the monolith filter without diffusing through the channel walls into the other plurality of channels. The channels are closed with the introduction of a sealant material into the open end of a channel. Preferably the number of channels in the first plurality is equal to the number of channels in the second plurality, and each plurality is evenly distributed throughout the monolith.

The catalytic wall-flow monolith filter is generally prepared by coating catalytic materials on the wall-flow monolith substrate. Suitable materials of the wall-flow monolith substrate include ceramic-like materials such as cordierite, alumina, silicon carbide, silicon nitride, zirconia, mullite, spodumene, alumina-silica-magnesia or zirconium silicate, or porous, refractory metal. Wall-flow monolith substrates may also be formed of ceramic fiber composite materials. Preferred wall-flow substrates are formed from cordierite and silicon carbide. Such materials are able to withstand the environment, particularly the high temperatures, encountered in treating the exhaust streams and can be made sufficiently porous. Such materials and their use in the manufacture of porous monolith substrates is well known in the art.

Generally, the wall-flow monolith substrate may have a porosity of 40 to 75%. Suitable techniques for determining porosity are known in the art and include mercury porosimetry and X-ray tomography.

The first SCR catalyst, the second SCR catalyst, and/or the third SCR catalyst ("SCR catalyst") can each comprise an oxide of a base metal, a molecular sieve, a metal exchanged molecular sieve, or a mixture thereof. The base metal can be selected from the group consisting of cerium (Ce), chromium (Cr), cobalt (Co), copper (Cu), iron (Fe), manganese (Mn), molybdenum (Mo), nickel (Ni), tungsten (W), vanadium (V), and mixtures thereof. SCR catalysts consisting of vanadium supported on a refractory metal oxide such as alumina, silica, zirconia, titania, ceria and combinations thereof are well known and widely used commercially in mobile applications. Typical compositions are described in U.S. Pat. Nos. 4,010,238 and 4,085,193, of which the entire contents are incorporated herein by reference. Compositions used commercially, especially in mobile applications, comprise $TiO_2$ on to which $WO_3$ and $V_2O_5$ have been dispersed at concentrations ranging from 5 to 20 wt % and 0.5 to 6 wt %, respectively. These catalysts may contain other inorganic materials such as $SiO_2$ and $ZrO_2$ acting as binders and promoters.

The SCR catalyst can comprise a molecular sieve or a metal exchanged molecular sieve. As is used herein "molecular sieve" is understood to mean a metastable material containing tiny pores of a precise and uniform size that may be used as an adsorbent for gases or liquids. The molecules which are small enough to pass through the pores are adsorbed while the larger molecules are not. The molecular sieve can be a zeolitic molecular sieve, a non-zeolitic molecular sieve, or a mixture thereof.

A zeolitic molecular sieve is a microporous aluminosilicate having any one of the framework structures listed in the Database of Zeolite Structures published by the International Zeolite Association (IZA). The framework structures include, but are not limited to those of the CHA, BEA, FAU, LTA, MFI, and MOR types. Non-limiting examples of zeolites having these structures include chabazite, faujasite, zeolite Y, ultrastable zeolite Y, beta zeolite, mordenite, silicalite, zeolite X, and ZSM-5. Aluminosilicate zeolites can have a silica-to-alumina molar ratio (SAR, defined as $SiO_2/Al_2O_3$) from at least about 5, preferably at least about 20, with useful ranges of from about 10 to 200.

As used herein, the term "non-zeolitic molecular sieve" refers to corner sharing tetrahedral frameworks where at least a portion of the tetrahedral sites are occupied by an element other than silicon or aluminum. Specific non-limiting examples of non-zeolitic molecular sieves include silicoaluminophosphates such as SAPO-34, SAPO-37 and SAPO 44. The silicoaluminophosphates can have framework structures that contain framework elements that are found in zeolites, such as BEA, CHA, FAU, LTA, MFI, MOR and other types described below.

The SCR catalyst can comprise a small-pore, a medium-pore or a large-pore molecular sieve, or combinations thereof.

The SCR catalyst can comprise a small-pore molecular sieve selected from the group consisting of aluminosilicate molecular sieves, metal-substituted aluminosilicate molecular sieves, aluminophosphate (AlPO) molecular sieves, metal-substituted aluminophosphate (MeAlPO) molecular sieves, silico-aluminophosphate (SAPO) molecular sieves, and metal substituted silico-aluminophosphate (MeAPSO) molecular sieves, and mixtures thereof. The SCR catalyst can comprise a small-pore molecular sieve selected from the group of Framework Types consisting of ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, KFI, LTA, MER, MON, NSI, OWE, PAU, PHI, RHO, RTH, SAT, SAV, SIV, THO, TSC, UEI, UFI, VNI, YUG, and ZON, and mixtures and/or intergrowths thereof. Preferably the small pore molecular sieve is selected from the group of Framework Types consisting of AEI, AFX, CHA, DDR, ERI, ITE, KFI, LTA, LEV, and SFW.

The SCR catalyst can comprise a medium-pore molecular sieve selected from the group of Framework Types consisting of AEL, AFO, AHT, BOF, BOZ, CGF, CGS, CHI, DAC, EUO, FER, HEU, IMF, ITH, ITR, JRY, JSR, JST, LAU, LOV, MEL, MFI, MFS, MRE, MTT, MVY, MWW, NAB, NAT, NES, OBW, PAR, PCR, PON, PUN, RRO, RSN, SFF, SFG, STF, STI, STT, STW, -SVR, SZR, TER, TON, TUN, UOS, VSV, WEI, and WEN, and mixtures and/or intergrowths thereof. Preferably, the medium pore molecular sieve selected from the group of Framework Types consisting of FER, MFI, and STT.

The SCR catalyst can comprise a large-pore molecular sieve selected from the group of Framework Types consisting of AFI, AFR, AFS, AFY, ASV, ATO, ATS, BEA, BEC, BOG, BPH, BSV, CAN, CON, CZP, DFO, EMT, EON, EZT, FAU, GME, GON, IFR, ISV, ITG, IWR, IWS, IWV, IWW, JSR, LTF, LTL, MAZ, MEI, MOR, MOZ, MSE, MTW, NPO, OFF, OKO, OSI, RON, RWY, SAF, SAO, SBE, SBS, SBT, SEW, SFE, SFO, SFS, SFV, SOF, SOS, STO, SSF, SSY, USI, UWY, and VET, and mixtures and/or intergrowths thereof. Preferably, the large pore molecular sieve is selected from the group of Framework Types consisting of BEA, MOR and OFF.

A metal exchanged molecular sieve can have at least one metal from one of the groups VB, VIB, VIIB, VIIIB, IB, or IIB of the periodic table deposited onto extra-framework sites on the external surface or within the channels, cavities, or cages of the molecular sieves. Metals may be in one of several forms, including, but not limited to, zerovalent metal atoms or clusters, isolated cations, mononuclear or polynuclear oxycations, or as extended metal oxides. Preferably, the metals can be iron, copper, and mixtures or combinations thereof.

A metal exchanged molecular sieve can contain in the range of from about 0.10 wt % to about 10 wt % of a group VB, VIB, VIIB, VIIIB, IB, or IIB metal located on extra framework sites on the external surface or within the channels, cavities, or cages of the molecular sieve.

The metal exchanged molecular sieve can be a copper (Cu) supported small pore molecular sieve having from about 0.1 to about 20.0 wt % copper of the total weight of the metal exchanged molecular sieve. Preferably copper is present from a about 1 wt % to about 6 wt % of the total weight of the catalyst, more preferably from about 1.8 wt. % to about 4.2 wt. % of the total weight of the metal exchanged molecular sieve.

The metal exchanged molecular sieve can be an iron (Fe) supported small pore molecular sieve having from about 0.1 to about 20.0 wt % iron of the total weight of the metal exchanged molecular sieve. Preferably iron is present from about 1 wt % to about 6 wt % of the total weight of the metal exchanged molecular sieve, more preferably from about 1.8 wt % to about 4.2 wt %.

In order to provide the catalytic wall-flow monolith filter of the present invention, the SCR catalyst is applied to the porous substrate, typically in the form of a washcoat. The application can be characterised as "in wall" application or "on wall" application. "In-wall" means that the SCR catalyst is present in the pores within the porous material. "On wall" means the SCR catalyst is present as a catalyst coating on the walls of the channels. As would be appreciated by a person skilled in the art, the percentage of the coating that is present "on wall" can be determined by techniques of the art, such as scanning electron microscopy (SEM) or optical microscopy.

The techniques for "in wall" or "on wall" application can depend on the viscosity of the material applied, the application technique (spraying or dipping, for example) and the presence of different solvents. Such application techniques are known in the art. The viscosity of the washcoat is influenced, for example, by its solids content. It is also influenced by the particle size distribution of the washcoat—a relatively flat distribution will give a different viscosity to a finely milled washcoat with a sharp peak in its particle size distribution—and rheology modifiers such as guar gums and other gums. Suitable coating methods are described in U.S. Pat. Nos. 6,599,570, 8,703,236 and 9,138,735, which are incorporated herein by reference.

The monolith filter comprises a first SCR catalyst coated on the first plurality of inner surfaces of the porous walls to form a first SCR catalyst porous layer, wherein the first SCR catalyst is coated from the first face. The first SCR catalyst porous layer covers inner surfaces of the porous walls ("on wall" coating).

The first SCR catalyst porous layer generally can have a mean pore size in the range of 0.1 μm to 10 μm, preferably from 0.2 μm to 8 μm, and more preferably from 0.5 μm to 7 μm, from 0.75 μm to 6 μm, from 0.8 μm to 5 μm, from 1 μm to 4 μm, from 1.2 μm to 3 μm, from 1.5 μm to 2 μm, even more preferably from 1.6 μm to 1.8 μm.

The mean pore size of the first SCR catalyst porous layer can be measured by techniques of the art, e.g., by Hg intrusion Porosimetry (MIP) on a Micromeritics Autopore instrument.

The first SCR catalyst porous layer may have a coating length of from 60 to 95% of the total length (L) of the monolith filter from the first face, preferably be from 80 to 90% L.

The first SCR catalyst may have a washcoat loading of between 0.1 g/in$^3$ and 5 g/in$^3$, preferably between 0.1 g/in$^3$ and 4.5 g/in$^3$, more preferably 0.5 g/in$^3$ and 4 g/in$^3$.

The monolith filter comprises the second SCR catalyst within the porous walls the porous walls ("in wall" coating), wherein the second SCR catalyst is coated from the second face.

The second SCR catalyst may have a coating length of from 60 to 95% of the total length L of the monolith filter from the second face, preferably be from 80 to 90% L.

The second SCR catalyst may have a washcoat loading of between 0.1 g/in$^3$ and 5 g/in$^3$, preferably between 0.1 g/in$^3$ and 4.5 g/in$^3$, more preferably 0.5 g/in$^3$ and 4 g/in$^3$.

The monolith filter comprises a third SCR catalyst coated on the second plurality of inner surfaces of the porous walls to form the third SCR catalyst porous layer, wherein the third SCR catalyst is coated from the second face. The third SCR catalyst porous layer covers inner surfaces of the porous walls ("on wall" coating).

The third SCR catalyst porous layer generally can have a mean pore size in the range of 0.1 μm to 10 μm, preferably from 0.2 μm to 8 μm, and more preferably from 0.5 μm to 7 μm, from 0.75 μm to 6 μm, from 0.8 μm to 5 μm, from 1 μm to 4 μm, from 1.2 μm to 3 μm, from 1.5 μm to 2 μm, even more preferably from 1.6 μm to 1.8 μm.

The third SCR catalyst may have a coating length of from 5 to 40% of the total length of the monolith filter (L) from the second face, preferably from 5 to 30% L.

The third SCR catalyst may have a washcoat loading of between 0.05 g/in$^3$ and 3 g/in$^3$, preferably between 0.1 g/in$^3$ and 2.5 g/in$^3$, more preferably 0.2 g/in$^3$ and 2.0 g/in$^3$.

According to a second aspect there is provided a method for the manufacture of a catalytic wall-flow monolith filter, the method comprising:
(a) providing a wall-flow monolith substrate comprising porous walls having a first end face and a second end face defining a longitudinal direction therebetween and first and second pluralities of channels extending in the longitudinal direction, wherein the first plurality of channels is open at the first end face and closed at the second end face, and wherein the second plurality of channels is open at the second end face and closed at the first end face;
(b) applying a first SCR catalyst washcoat slurry on the first plurality of inner surfaces of the porous walls;
(c) applying a second SCR catalyst washcoat slurry on the second plurality of inner surfaces of the porous walls so that the second SCR catalyst washcoat slurry permeates in the porous walls;
(d) applying a third SCR catalyst washcoat slurry on the second plurality of inner surfaces of the porous walls;
(e) calcining a coated wall-flow monolith substrate obtained from steps (b), (c), and (d) to produce the catalytic wall-flow monolith filter.

The first SCR catalyst washcoat slurry preferably comprise a molecular sieve or a metal exchanged molecular sieve described in this disclosure, a binder, a pore former, and a solvent (e.g., water). Examples of suitable binders are alumina binders, such as Boehmites, alpha alumina, beta alumina, and gamma alumina. Examples of pore formers include cellulose pore formers, polyethylene, starch, graphite, polypropylene, polyaramides, polytetrafluoroethylene, polystyrene, cellulose fibres and polymethacrylmethacrylate, e.g., Arbocel, Vivapur, Mipelon PM-200, Propyltex, Orgasol and Remyrise.

The molecular sieve and the pore former present in the first SCR catalyst washcoat slurry can have a weight ratio of between 10:1 to 1:3, preferably between 8:1 to 1:2.

The molecular sieve and the binder present in the first SCR catalyst washcoat slurry can have a weight ratio of between 20:1 and 1:1, preferably from 12:1 to 3:1, more preferably from 10:1 to 5:1.

The first SCR catalyst washcoat slurry may have a viscosity of between 5 and 1500 cPs, preferably between 500 and 1200 cPs, more preferably between 700 and 900 cPs.

The viscosity can be measured at 20° C. on a Brookfield RV DVII+Extra Pro viscometer using a SC4-27 spindle at 50 rpm spindle speed.

The second SCR catalyst washcoat slurry preferably comprise a molecular sieve as described in this disclosure, a binder, and a solvent (e.g., water). Examples of suitable binders are alumina binders, such as Boehmites, alpha-alumina, beta-alumina, and gamma-alumina.

The molecular sieve and the binder present in the second SCR catalyst washcoat slurry can have a weight ratio of between 20:1 and 1:1, preferably from 12:1 to 3:1, more preferably about 9:1.

The second SCR catalyst washcoat slurry may have a viscosity of between 5 and 100 cPs, preferably between 5 and 30 cPs, more preferably between 5 and 15 cPs.

The third SCR catalyst washcoat slurry preferably comprise the molecular sieve as described in this disclosure, a binder, a pore former, and a solvent (e.g., water). Examples of suitable binders are alumina binders, such as Boehmites, alpha-alumina, beta-alumina, and gamma-alumina. Examples of pore formers include cellulose pore formers, polyethylene, starch, graphite, polypropylene, polyaramides, polytetrafluoroethylene, polystyrene, cellulose fibres and polymethacrylmethacrylate, e.g., Arbocel, Vivapur, Mipelon PM-200, Propyltex, Orgasol and Remyrise.

The molecular sieve and the pore former present in the third SCR catalyst washcoat slurry can have a weight ratio of between 10:1 to 1:3, preferably between 8:1 to 1:2.

The molecular sieve and the binder present in the third SCR catalyst washcoat slurry can have a weight ratio of between 20:1 and 1:1, preferably from 12:1 to 3:1, more preferably from 10:1 to 5:1.

The third SCR catalyst washcoat slurry may have a viscosity of 5 and 1500 cPs, preferably between 500 and 1200 cPs, more preferably between 700 and 900 cPs.

In a preferred method for the manufacture of the catalytic wall-flow monolith filter, the third SCR catalyst washcoat slurry is the same as the first SCR catalyst washcoat slurry.

The first SCR catalyst washcoat slurry, the second SCR catalyst washcoat slurry, and the third SCR catalyst washcoat slurry may be applied to the substrate by known methods. There are many suitable ways to apply the SCR catalyst washcoat slurry to the substrate. For example, coating of the substrate by the washcoat slurry can be performed by immersing the substrate vertically in the slurry such that the desired coating length is achieved. The substrate can be left in the slurry for a sufficient period of time to allow the desired amount of the slurry to move into the substrate. The substrate is removed from the slurry, and excess slurry is removed from the wall-flow substrate first by allowing it to drain from the channels of the substrate, then by blowing on the slurry on the substrate with compressed air (against the direction of slurry penetration), and then pulling a vacuum from the direction of slurry penetration.

Another method for coating a filter substrate include the steps of: (a) depositing a pre-determined amount of a liquid into a containment means at an upper end of the filter substrate using a shower head, wherein the shower head comprises a plurality of apertures arranged to dispense the liquid onto an upper end face of the filter substrate; and (b) coating the channels having open ends at the upper end of the filter substrate with the pre-determined amount of liquid from the containment means by applying a vacuum to a lower end of the filter substrate to draw the liquid along the channels having open ends at the upper end of the filter substrate. See, e.g., EP3122458B1.

The coated substrates are dried typically at about 100° C. and calcined at a higher temperature (e. g. 300 to 450° C.).

According to a third aspect there is provided an emission treatment system for treating a flow of a combustion exhaust gas, the system comprising the catalytic wall-flow monolith filter according to this invention, wherein the first end face is upstream of the second end face.

According to a fourth aspect there is provided a method for treating a flow of a combustion exhaust gas comprising NOx, the method comprising passing the exhaust stream through the catalytic wall-flow monolith filter according to this invention, wherein the first end face is upstream of the second end face.

Comparative Example 1

A washcoat slurry A containing Cu-exchanged zeolite (CHA, SAR=18.5, Cu loading=3.3 wt %, D90(v)=4.0 μm) and a stabilised gamma alumina (d90(v) s 7 um) with a 9:1 weight ratio suspended in water was prepared. The washcoat slurry had a D90(v) of 4-6 μm. Tetraethylammonium hydroxide (TEAH, the amount TEAH was 4 wt % of the zeolite) was added to the slurry prior to the gamma alumina addition.

A washcoat slurry B containing Natrasol (a cellulose thickener) at 0.4 wt %, Cu exchanged zeolite (CHA, SAR=18.5, Cu loading=3.3 wt %, D90(v)=4.0 μm), Arbocel UFC100 (a cellulose supplied by JRS) and a boehmite (D90(v) s 1 μm) with a weight ratio of 9:5:1 (zeolite:arbocel:boehmite) suspended in water was prepared. The washcoat had a D90(v) of 20 μm Washcoat slurries A and B were applied to a filter substrate (SC18 supplied by NGK, porosity=63%, mean pore size=20 μm, 300 cpsi and 12 mil wall thickness) using the method disclosed in EP3122458.

The washcoat slurry A was applied to the filter substrate from the outlet face to coat about 80-85% of the substrate length, with a calcined loading of 1.5 g/in$^3$. The washcoat slurry B was applied to the filter substrate from the inlet face to coat about 80-85% of the substrate length, with a calcined loading of 0.6 g/in$^3$.

The coated filter substrate (having two doses of coating) was dried at about 100° C. and calcined at 450° C. The catalytic filter produced contains a first SCR catalyst porous layer ("on wall" coating) and a second SCR catalyst ("in wall" coating).

Example 2

The washcoat slurry B was then applied to the coated filter substrate obtained from Comparative Example 1 from the outlet face to coat about 20% of the substrate length, with a calcined loading of 0.05 g/in$^3$.

The coated filter substrate (having three doses of coating) was dried at about 100° C. and calcined at 450° C. The catalytic filter produced contains a first SCR catalyst porous layer ("on wall" coating), a second SCR catalyst ("in wall" coating), and a third SCR catalyst porous layer ("on wall" coating).

Comparative Example 3

A washcoat slurry C containing a Cu-exchanged zeolite (AEI, SAR=20, Cu loading=3.75 wt %, D90(v)=4.0 μm) and a stabilised gamma alumina (D90(v)≤μm) with a 9:1 ratio suspended in water was prepared. Hypermer™ KD6 (a high molecular weight non-ionic dispersant available from Croda) and tetraethyl ammonium hydroxide (TEAH) were added at 5 wt % and 1 wt % relative to the zeolite respectively prior to the alumina addition. The washcoat had a D90(v) of 4-6 μm.

A washcoat slurry D containing Natrasol (a cellulose thickener) at 0.4 wt %, Cu-exchanged zeolite (CHA, SAR=20, Cu loading=3.75 wt %, D90(v)=4.0 μm), Arbocel UFC100 (a cellulose supplied by JRS) and a boehmite (D90(v) s 1 μm) with a 9:5:1 (zeolite:arbocel:boehmite) ratio suspended in water was prepared. The washcoat had a D90(v) of 20 μm Washcoat slurries C and D were applied to a filter substrate (SC18 supplied by NGK, porosity=63%, mean pore size=20 μm, 300 cpsi and 12 mil wall thickness) using the method disclosed in EP3122458.

The washcoat slurry C was applied to the filter substrate from the outlet face to coat about 80-85% of the substrate length, with a calcined loading of 1.3 g/in$^3$. The washcoat slurry D was applied to the filter substrate from the inlet face to coat about 80-85% of the substrate length, with a calcined loading of 0.55 g/in$^3$.

The coated filter substrate was dried at about 100° C. and calcined at 450° C. The catalytic filter thus produced contains a first SCR catalyst porous layer ("on wall" coating) and a second SCR catalyst ("in wall" coating).

Example 4

The washcoat slurry D was then applied to the coated filter substrate obtained from Comparative Example 3 from the outlet face to coat about 20% of the substrate length, with a calcined loading of 0.05 g/in$^3$.

The coated filter substrate (having three doses of coating) was dried at about 100° C. and calcined at 450° C. The catalytic filter thus produced contains a first SCR catalyst porous layer ("on wall" coating), a second SCR catalyst ("in wall" coating), and a third SCR catalyst porous layer ("on wall" coating).

Filtration Efficiency Test of Coated Filter Substrate from Comparative Example 1 and Example 2

The filtration efficiencies of coated filter substrates from the above examples was tested under various conditions. The first conditions are oven cleaned with a cold start WLTC test (mass high), the second conditions are hot start WLTC test (mass high) and the third conditions are cold start WLTC (regen) test (mass low). WLTC is world light duty test cycle and regen conditions are elevated temperatures to break down the soot cake. Measured using SPCS and stated as particulate number per kilometer. Test results are shown in Tables 1 and 2. Tables 1 and 2 show that the addition of the third porous coating on the outlet channel significantly improved the filtration efficiency of the coated filter.

TABLE 1

| Coated filter substrate | Cold WLTC Clean PN (#/km) | WLTC Regen PN (#/km) |
|---|---|---|
| Comparative Example 1 (2 Dose) | 1.50E+09 | 1.93E+12 |
| Example 2 (3 Dose) | 1.93E+08 | 9.43E+10 |

TABLE 2

| Coated filter substrate | Cold WLTC Clean PN (#/km) | WLTC Regen PN (#/km) |
|---|---|---|
| Comparative Example 3 (2 Dose) | 2.72E+11 | 4.61E+12 |
| Example 4 (3 Dose) | 2.01E+10 | 5.64E+11 |

The invention claimed is:
1. A catalytic wall-flow monolith filter for use in an emission treatment system, the monolith filter comprising porous walls and having a first face and a second face defining a longitudinal direction therebetween and first and second pluralities of channels extending in the longitudinal direction,
- wherein the first plurality of channels provides a first plurality of inner surfaces and is open at the first face and closed at the second face, and wherein the second plurality of channels provides a second plurality of inner surfaces and is open at the second face and closed at the first face;
- wherein the monolith comprises a first selective catalytic reduction (SCR) catalyst coated on the first plurality of inner surfaces of the porous walls to form a first SCR catalyst porous layer;
- wherein the monolith comprises a second SCR catalyst within the porous walls;
- wherein the monolith comprises a third SCR catalyst coated on the second plurality of inner surfaces of the porous walls to form a third SCR catalyst porous layer;
- wherein the first SCR catalyst is coated from the first face and has a coating length of from 60 to 95% of the total length (L) of the monolith filter from the first face;
- wherein the second SCR catalyst is coated from the second face and has a coating length of from 60 to 95% of the total length L of the monolith filter from the second face; and
- wherein the third SCR catalyst is coated from the second face and has a coating length of from 5 to 40% of the total length L of the monolith filter from the second face.

2. The catalytic wall-flow monolith filter of claim 1, wherein the first SCR catalyst, the second SCR catalyst, and/or the third SCR catalyst each comprises an oxide of a base metal, a molecular sieve, a metal exchanged molecular sieve, or a mixture thereof.

3. The catalytic wall-flow monolith filter of claim 1, wherein the first SCR catalyst, the second SCR catalyst, and/or the third SCR catalyst each comprises a molecular sieve or a metal exchanged molecular sieve.

4. The catalytic wall-flow monolith filter of claim 1, wherein the first SCR catalyst, the second SCR catalyst, and/or the third SCR catalyst each comprises a small-pore molecular sieve selected from the group consisting of aluminosilicate molecular sieves, metal-substituted aluminosilicate molecular sieves, aluminophosphate (AlPO) molecular sieves, metal-substituted aluminophosphate (MeAlPO) molecular sieves, silico-aluminophosphate (SAPO) molecular sieves, and metal substituted silico-aluminophosphate (MeAPSO) molecular sieves, and mixtures thereof.

5. The catalytic wall-flow monolith filter of claim 1, wherein the first SCR catalyst, the second SCR catalyst, and/or the third SCR catalyst each comprises a medium-pore molecular sieve selected from the group of Framework Types consisting of AEL, AFO, AHT, BOF, BOZ, CGF, CGS, CHI, DAC, EUO, FER, HEU, IMF, ITH, ITR, JRY, JSR, JST, LAU, LOV, MEL, MFI, MFS, MRE, MTT, MVY, MWW, NAB, NAT, NES, OBW, PAR, PCR, PON, PUN, RRO, RSN, SFF, SFG, STF, STI, STT, STW, -SVR, SZR, TER, TON, TUN, UOS, VSV, WEI, and WEN, and mixtures and/or intergrowths thereof.

6. The catalytic wall-flow monolith filter of claim 1, wherein the first SCR catalyst, the second SCR catalyst, and/or the third SCR catalyst each comprises a metal exchanged molecular sieve having at least one metal from one of the groups VB, VIB, VIIB, VIIIB, IB, or IIB of the periodic table deposited onto extra-framework sites on the external surface or within the channels, cavities, or cages of the molecular sieves.

7. The catalytic wall-flow monolith filter of claim 6, wherein the metal is selected from the group consisting of iron, copper, and mixtures thereof.

8. The catalytic wall-flow monolith filter of claim 1, wherein the first SCR catalyst porous layer has a coating length of from 80 to 90% of the total length (L) of the monolith filter.

9. The catalytic wall-flow monolith filter of claim 1, wherein the first SCR catalyst has a washcoat loading of between 0.5 g/in$^3$ and 4 g/in$^3$.

10. The catalytic wall-flow monolith filter of claim 1, wherein the second SCR catalyst has a coating length of from 80 to 90% of the total length L of the monolith filter.

11. The catalytic wall-flow monolith filter of claim 1, wherein the second SCR catalyst has a washcoat loading of between 0.5 g/in$^3$ and 4 g/in$^3$.

12. The catalytic wall-flow monolith filter of claim 1, wherein the third SCR catalyst has a coating length of from 5 to 30% of the total length L of the monolith filter.

13. The catalytic wall-flow monolith filter of claim 1, wherein the third SCR catalyst has a washcoat loading of between 0.2 g/in$^3$ and 2.0 g/in$^3$.

14. A method for the manufacture of a catalytic wall-flow monolith filter of claim 1, the method comprising:
- (a) providing a wall-flow monolith substrate comprising porous walls having a first end face and a second end face defining a longitudinal direction therebetween and first and second pluralities of channels extending in the longitudinal direction, wherein the first plurality of channels is open at the first end face and closed at the second end face, and wherein the second plurality of channels is open at the second end face and closed at the first end face;
- (b) applying a first SCR catalyst washcoat slurry on the first plurality of inner surfaces of the porous walls to form a coating length of from 60 to 95% of the total length (L) of the monolith filter from the first face;
- (c) applying a second SCR catalyst washcoat slurry on the second plurality of inner surfaces of the porous walls to form a coating length of from 60 to 95% of the total length L of the monolith filter from the second face and the second SCR catalyst washcoat slurry permeates in the porous walls;
- (d) applying a third SCR catalyst washcoat slurry on the second plurality of inner surfaces of the porous walls to form a coating length of from 5 to 40% of the total length L of the monolith filter from the second face;
- (e) calcining a coated wall-flow monolith substrate obtained from steps (b), (c), and (d) to produce the catalytic wall-flow monolith filter.

15. The method of claim 14, wherein step (d) is performed before step (b).

16. An emission treatment system for treating a flow of a combustion exhaust gas, the system comprising the catalytic wall-flow monolith filter according to claim 1.

17. A method for treating a flow of a combustion exhaust gas comprising NOx, the method comprising passing the exhaust stream through the catalytic wall-flow monolith filter of claim 1, wherein the first end face is upstream of the second end face.

* * * * *